May 22, 1923.
H. G. VOIGHT
LOCK FOR FILLER CAPS
Filed March 27, 1918     2 Sheets-Sheet 1
1,456,161
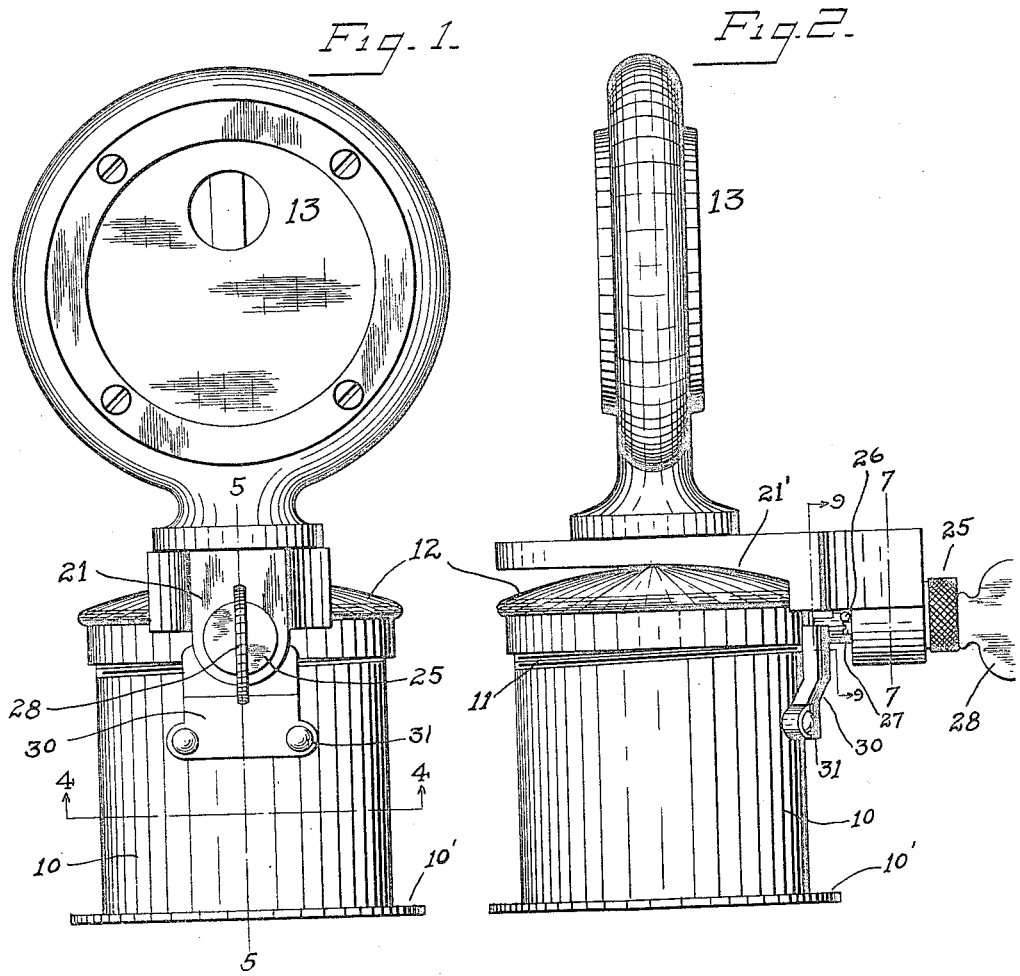
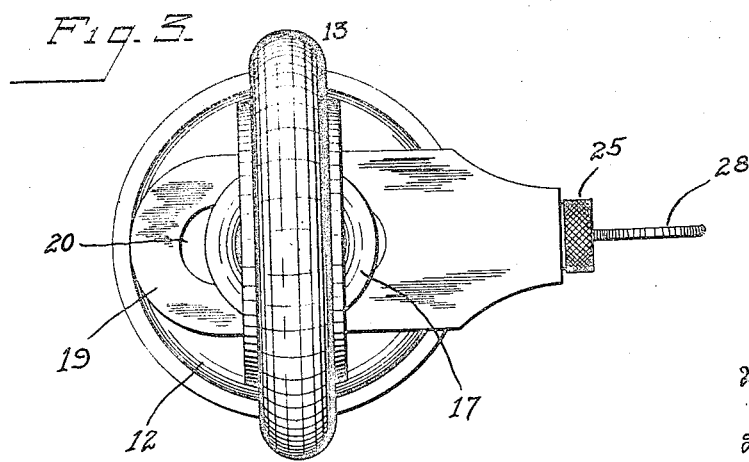
INVENTOR
Henry G. Voight
BY
Henry C. Rockwell
ATTORNEY

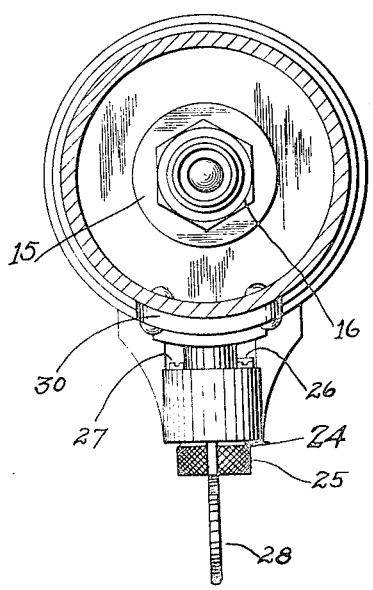
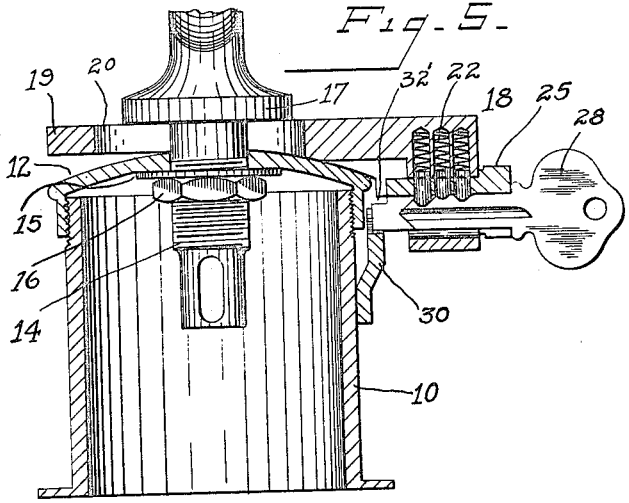
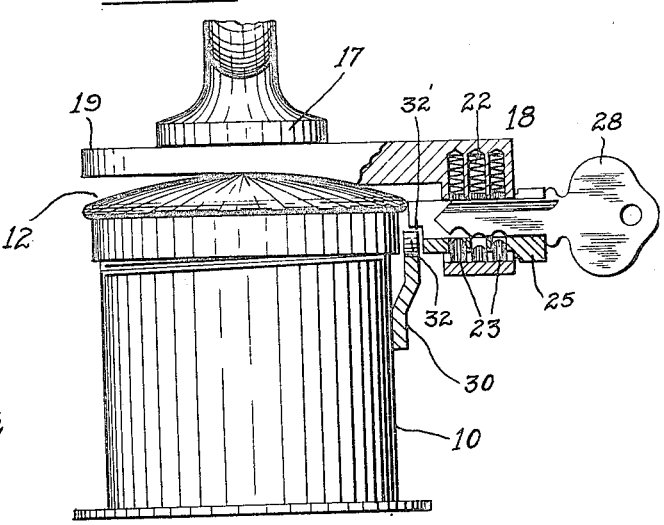
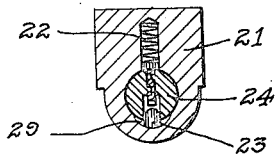
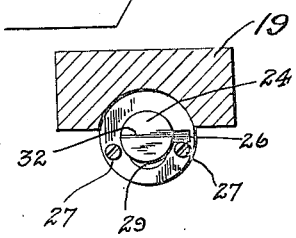

Patented May 22, 1923.

1,456,161

UNITED STATES PATENT OFFICE.

HENRY G. VOIGHT, OF NEW BRITAIN, CONNECTICUT, ASSIGNOR TO SARGENT & COMPANY, OF NEW HAVEN, CONNECTICUT, A CORPORATION OF CONNECTICUT.

LOCK FOR FILLER CAPS.

Application filed March 27, 1918. Serial No. 224,963.

*To all whom it may concern:*

Be it known that I, HENRY G. VOIGHT, a citizen of the United States, residing in New Britain, county of Hartford, and State of Connecticut, have invented certain new and useful Improvements in Locks for Filler Caps, of which the following is a full, clear, and exact description.

This invention relates to locks for filler caps, and more particularly to locks for caps that are used to close the filling tubes of automobile radiators, gasoline tanks, etc.

The primary object of this invention is to provide means for locking a filler cap to its filler tube so that an unauthorized person cannot remove the cap from its tube.

A further object of this invention is to provide a key-controlled lock for a filler cap that may be easily and quickly attached to any one of a number of different size caps.

Many of the radiator caps now in use upon automobiles are provided with the so-called moto-meter, a rather valuable article which indicates the temperature of the water in the radiator, or with different ornaments which are more or less valuable. It is very easy for a person who is so inclined to steal the article mounted upon the radiator cap by simply unscrewing the cap from the radiator and carrying off both the cap and the article attached thereto.

An important object of this invention is to provide locking means for preventing an unauthorized person from unscrewing the filler cap from the filler tube, and thereby prevent the article which is mounted upon the cap but secured to the under surface of the same from being stolen.

To these and other ends, the invention consists in the novel features and combinations of parts to be hereinafter described and claimed.

In the accompanying drawings:

Fig. 1 is a front view of a radiator tube and cap having my locking device applied thereto. What is known as a moto-meter is shown mounted upon the cap;

Fig. 2 is a side view of Fig. 1;

Fig. 3 is a plan view of Fig. 2;

Fig. 4 is a sectional view taken on the line 4—4 of Fig. 1, looking in the direction of the arrows;

Fig. 5 is a sectional view taken on the line 5—5 of Fig. 1, showing the key-barrel in its locked position;

Fig. 6 is a view similar to Fig. 2, showing a part of the locking mechanism broken away and the key-barrel in its unlocked position;

Fig. 7 is a sectional view taken on line 7—7 of Fig. 2, showing the key-barrel turned to its locked position;

Fig. 8 is a view similar to Fig. 7, but showing the key-barrel in its unlocked position; and Fig. 9 is a sectional view on line 9—9 of Fig. 2, looking in the direction of the arrows.

In the drawings, the numeral 10 is used to designate a filler tube or neck such as is commonly provided upon the radiator tanks of automobiles. This tube 10 is provided with a flange 10' formed upon its lower end, by means of which the tube may be secured to the tank upon which it is mounted. These tubes are commonly provided with threads upon their upper ends, such as 11, which threads are adapted to cooperate with corresponding threads formed upon the filler cap 12. I have shown mounted upon the filler cap 12 the so-called moto-meter 13, which is a device for indicating the temperature of the cooling water in the radiator. The moto-meter, which has gone into extensive use, is secured to the radiator filler cap by forming a drill hole through the cap and inserting the threaded spindle 14, with which these moto-meters are provided, through the drill hole in the cap 12 and securing the same within the cap by means of a washer 15 and threaded nut 16. A shoulder, such as 17, is commonly formed upon the moto-meter where the threaded spindle joins on to the same, which shoulder is usually forced into clamping engagement with the upper face of the filler cap 12 by means of the nut 16. The structure so far described is well known and need not be described herein in further detail.

It should be noted that the means by which the moto-meter is secured to the filler cap 12, that is, the nut 16, is positioned inside of the cap 12, so that in order to remove the moto-meter from the cap 12 it is necessary for access to be had to the under face of this cap. When an ill-disposed person desires to steal the moto-meter 13 or ornament which may be secured to the filler cap, he does not bother to remove the ornament from the filler cap, but simply unscrews the cap from the filler tube 11 and carries off both the cap and the device secured thereto. In order to prevent the moto-meter or other device with which the cap may be provided from being stolen by removing the cap from the filler tube, I have provided a locking device designated in its entirety by the numeral 18. This locking device consists of a bracket-like member 19 which is constructed to be secured to the outer face of the cap 12. The bracket 19 preferably has a longitudinal slot 20 formed therein, as indicated in Figs. 3 and 5. This slot 20 is of sufficient width to permit the spindle 14 to be inserted therethrough. The lower face of the bracket 19 is formed curved, as indicated at 21', to conform to the curvature of the outer surface of the cap 12, in order that the bracket 19 may rest firmly thereupon in a substantially horizontal plane. In order to provide convenient means for rigidly securing the bracket 19 to the cap 12, when the latter is provided with a moto-meter having the type of securing means above described, I have taken advantage of the particular manner in which the moto-meter is commonly secured to the cap 12 to use this same means for securing the bracket 19 rigidly to the cap. I accomplish this by inserting the spindle 14 through the opening 20 formed in the bracket 19, and when the bracket 19 has been properly adjusted upon the cap 12, it is then rigidly clamped in place between the upper face of the cap 12 and the lower face of the shoulder 17 by tightening the nut 16. The nut 16 may, if desired, be locked upon the spindle 14 in any one of many well-known ways. It is apparent that this would secure the moto-meter and the bracket 19 upon the cap 12 in such a manner that they could only be removed when access was had to the under side of the cap to remove the locking means from the nut and unscrew the same. Such a locking means for the nut 16, however, may or may not be provided, as without this, the nut may be screwed upon the spindle 14 so tightly that it would render very difficult the removal of the moto-meter from the cap, unless the nut were unscrewed from the inside of the same by the use of a wrench. Upon one end of the bracket 19 is formed an extension 21, which extension is constructed to form the body portion of a pin tumbler lock. This body portion 21 is provided with the well-known pin tumbler sockets 2, which are adapted to receive the pin tumblers 23. The extension 21 has an opening formed therethrough in which a key-barrel 24 is rotatably mounted. The outer end of this key-barrel has formed thereupon a knurled collar 25, which contacts with the outer face of the extension 21 to limit the inward movement of the key-barrel, and also serves as means which may be conveniently grasped by the fingers to rotate the key-barrel from its unlocked to its locked position. The key-barrel is held within the extension 21 against longitudinal movement in an outward direction by a small pin 26 which is rigidly mounted in the key-barrel adjacent the inner end thereof. This pin extends outwardly from the key-barrel in a radial direction, and is positioned to contact with the inner face of the extension 21. The pin 26, in addition to preventing the key-barrel from being displaced outwardly in a longitudinal direction, serves also as means for limiting the arc through which the key-barrel may be rotated, by contact with either one or the other of the stop screws 27, which screws are mounted upon the inner face of the extension 21 to serve as stops for the pin 26.

In order that the key 28 may be withdrawn from its lock when the key-barrel is turned to its unlocked position, that is, when the pin tumblers 23 are turned out of alignment with the pin tumbler sockets 22, it is necessary that means be provided to permit the pin tumblers 23 to move outwardly sufficiently to clear the edge of the key 28, which engages these pin tumblers. The means which I have provided for this purpose consists of a trough or groove clearance space 29 formed in the lower portion of the opening in which the key-barrel 24 rotates and extends longitudinally of the same. This trough or groove permits the pin tumblers 23 to be moved outwardly in a radial direction sufficiently to clear the key 28, as shown in Figs. 6 and 8. By this arrangement the key 28 may be freely removed from and inserted in its key-plug when the same is turned either to its locked or unlocked position. Furthermore, by constructing the trough 29 in the manner shown, the key-barrel 24 is free to rotate when the pin tumblers are in the extended position shown in Figs. 6 and 8, that is, when the pin tumblers are in this position, the key-barrel may be easily rotated to its locked position by grasping the knurled collar 25 without necessitating the use of the key 28.

The filler tube preferably has secured to a wall of the same a lock-engaging plate 30, which may be rigidly secured to the filler tube 10 by rivets such as 31. This plate 30 is positioned to cooperate with the inner end of the key-barrel 24, and the upper edge of this plate 30 has a notch 32 formed therein, as shown in Figs. 5 and 6, which notch is adapted to receive the inner end of the key-barrel. The inner end of the key-barrel is cut away, as indicated by the numeral 32', in order that the same will clear the plate 30 when the barrel is rotated to its unlocked position, as shown in Fig. 6, but when the key-barrel is rotated to its locked position, its inner end is positioned so that it will lie in the notch 32 formed in the plate 30, as shown in Fig. 5. It will thus be seen that when the key-barrel has been turned to its locked position so that its inner end engages the notch 32, and the key 28 has been removed from the lock, the bracket 19 and the cap 12, to which the bracket is rigidly clamped, will be held against rotation in either direction, that is, when the key-barrel 24 is turned to its locked position, as shown in Fig. 5, the cap cannot be rotated to unscrew the same from the filler tube 11.

The object in forming the elongated slot 20 in the bracket 19 is to permit the bracket to be easily and quickly applied to filler caps of different diameters, it being apparent that if it is desired to secure the bracket 19 to a filler cap either larger or smaller than the cap herein disclosed, all that is necessary is to adjust the bracket slightly in a radial direction to move the pin tumbler lock towards or from the plate 30. It will be apparent, however, that should it be desired to provide a bracket 19 which is adapted to be applied to a particular filler cap, the dimensions of which are known so that no provision for adjustment is necessary, the slot 20 would then be replaced by a drill hole which would snugly receive the spindle 14.

From the above description, when read in connection with the drawings, it will be apparent that the device herein disclosed may be easily and quickly applied to radiator caps which are provided with moto-meters, in order to prevent the filler cap from being unscrewed from its filler tube, and thereby preventing the moto-meter from being stolen.

Although I have illustrated and described my locking device as applied to the filler cap of a radiator and secured thereto by the threaded spindle formed upon a moto-meter, it will be apparent that my device may be used for various other purposes and may be secured to the cap or cover by numerous means other than the means herein described.

What I claim is:

1. A radiator filler tube, a cap therefor, a separate member mounted upon the outer face of said cap but secured thereto from the under surface of the cap, and key-controlled means for locking the cap to the filler tube against manual removal, said key-controlled means carried by and retained in its operative position by said separate member.

2. An automobile filler tube, a filler cap therefor, and key-controlled means secured to said cap for locking the cap to the tube against manual removal, said key-controlled means being constructed to be applied to filler caps of different sizes.

3. A radiator filler tube, a cap therefor, a temperature indicating device applied to the cap having a shoulder formed thereupon, means within the cap for securing the indicator device to the cap, and key-controlled means for securing the cap to the filler tube, said key-controlled means being secured to said cap by said shoulder.

4. A radiator cap, means on said cap providing a horizontally disposed opening, a key barrel mounted in said opening, key-controlled means to lock said barrel in predetermined position, and means on the key barrel and movable by the rotation thereof to position to lock the cap in place.

5. A locking device for securing a container cap upon its tube, comprising a bracket member mounted upon said cap and having a lock casing formed thereupon, a member secured to said tube to cooperate with said lock, and a key barrel rotatably mounted in said casing, said key barrel having a portion constructed to be moved into and out of locking engagement with said member to thereby secure said cap to said tube.

6. A radiator filler tube, a cap therefor, a bracket member secured to said cap, said bracket member having a lock casing formed at one end thereof, a key-barrel rotatable in said casing, and a notched member upon said filler tube, said key-barrel being constructed to be rotated into and out of locking engagement with said notched member to render more difficult the removal of said cap from its filler tube.

7. A radiator filler tube, a cap therefor, a bracket member secured to said cap, said bracket member having a lock casing formed at one end thereof, a key-barrel rotatable in said casing, a member upon said filler tube cooperating with the inner end of said key-barrel to prevent said cap from being removed from its filler tube, and a shoulder formed upon the outer end of said key-barrel adapted to be grasped by the fingers to rotate said barrel from its unlocked to its locked position.

8. A locking device for securing a filler cap to its filler tube, comprising an elongated slotted bracket member adjustably mounted upon said cap, a lock case upon one end of said member, a key barrel rotatably mounted in said case, and means cooperating with said key barrel secured to said filler tube, said key barrel having a portion thereof notched and positioned to be rotated into and out of locking engagement with said means.

9. A radiator filler tube, a filler cap, a separate member mounted upon the outer face of said cap and secured thereto at the under surface of the cap, manually controlled means for locking said cap to said tube against unauthorized removal, and key-controlled means for releasing said locking means.

10. A radiator filler tube, a filler cap, a locking device adjustably mounted upon said cap, manually controlled means for operating said locking device for rendering more difficult the removal of said cap from said tube, and key-controlled means for unlocking said locking device.

11. A radiator filler tube, a filler cap, a locking device secured to said cap, manually controlled means upon said device for rendering more difficult the removal of said cap from said tube, and key-controlled means for releasing said locking means, said locking device constructed to be adjusted to filler caps of different sizes.

12. A receptacle having a filler tube, a filler cap, a key-controlled locking device mounted upon said cap, said locking device having an extension formed thereupon constructed to be adjustably secured to filler caps of different sizes.

13. A receptacle having a filler tube and a cap therefor adapted to be secured thereon by a turning motion, one of said members having a part presenting a notch, and a key controlled locking device connected to the other member and having a portion adapted to be moved, by the rotation of the key into engagement with the notch to lock the cap upon the tube.

14. A receptacle having a filler tube and a cap adapted to be screwed thereon, portions of said members being provided with an opening and a notch adapted to be brought into alignment and a locking device including a key barrel received in said opening and having a member moved by the rotation of said barrel into position to engage said notch.

15. A receptacle, a filler cap removably secured thereto, a radiator ornament mounted on the cap and secured at the underside thereof and key controlled means to lock said cap upon the receptacle, said means including a key barrel and a member moved to locking position by the rotation of said barrel.

16. A receptacle having a filler tube, a filler cap, a bracket, means for rigidly securing said bracket to said cap in different positions of adjustment, a key controlled locking device carried by said bracket, and means upon said filler tube positioned to cooperate with said locking device to lock said cap to said tube against unauthorized removal.

17. A filler tube cap, a lock case carried thereby, a lock in said case including a horizontally disposed key barrel, and key-controlled means for locking said barrel in predetermined position, and means adjacent the inner end of the key barrel and moved to locking position thereby to engage a part of the filler tube to lock the cap against rotation.

In witness whereof, I have hereunto set my hand on the 19th day of March, 1918.

HENRY G. VOIGHT.